United States Patent
Ranjbar et al.

(10) Patent No.: US 11,522,574 B1
(45) Date of Patent: Dec. 6, 2022

(54) PHASE BASED DISTANCE ESTIMATION WITH CARRIER FREQUENCY OFFSET

(71) Applicant: Shenzhen Goodix Technology Co., Ltd., Shenzhen (CN)

(72) Inventors: Mohammad Ranjbar, San Diego, CA (US); Amir Dezfooliyan, San Diego, CA (US); Waleed Younis, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/491,499

(22) Filed: Sep. 30, 2021

(51) Int. Cl.
*H04B 1/403* (2015.01)
*H04B 1/48* (2006.01)

(52) U.S. Cl.
CPC .............. *H04B 1/403* (2013.01); *H04B 1/48* (2013.01)

(58) Field of Classification Search
CPC ........... H04B 1/403; H04B 1/48; G01S 17/08; G01S 17/32
See application file for complete search history.

(56) References Cited

U.S. PATENT DOCUMENTS

| | | | | |
|---|---|---|---|---|
| 2003/0195723 A1* | 10/2003 | Bensky | ................... | G01S 13/84 702/189 |
| 2008/0198903 A1* | 8/2008 | Kawai | ...................... | H04B 1/48 375/135 |
| 2022/0209873 A1* | 6/2022 | Ryan | ..................... | H04B 17/11 |

* cited by examiner

*Primary Examiner* — Nguyen T Vo
(74) *Attorney, Agent, or Firm* — Kilpatrick Townsend & Stockton, LLP (57) ABSTRACT

A transceiver is disclosed. The transceiver accesses a CFO (carrier frequency offset) estimate, and, for each of one or more working frequencies: transmits a transmitter RF signal at each working frequency, receives a receiver RF signal at each working frequency, and generates first I/Q measurement data based at least in part on the received receiver RF signal and the CFO estimate. In some embodiments, the transceiver receives I/Q measurement information for each working frequency. In some embodiments, the transceiver generates second I/Q measurement data based at least in part on the received I/Q measurement information. In some embodiments, the transceiver estimates a distance between the antenna and an antenna of another device based at least in part on the first and second I/Q measurement data.

13 Claims, 7 Drawing Sheets

PHASE BASED DISTANCE ESTIMATION WITH CARRIER FREQUENCY OFFSET

TECHNICAL FIELD

The subject matter described herein relates to determining a distance (ranging) between two transceivers, and more particularly to determining the distance in the presence of carrier frequency offset (CFO).

BACKGROUND

Distances between two communicating transceivers are increasingly used for various applications. For example, various Bluetooth Low Energy (BLE) and internet of things (IOT) applications require accurate distance measurements. Various distance measurement or ranging techniques are used to determine the distances between transceivers. Of these, phase-based ranging techniques are of increasing interest. Techniques for accurately calculating distances between transceivers in the presence of CFO are needed in the art.

SUMMARY

One inventive aspect is a transceiver circuit, including an antenna, a receiver RF chain configured to receive a receiver RF signal from the antenna, a transmitter RF chain configured to transmit a transmitter RF signal to the antenna, and a controller configured to access a CFO (carrier frequency offset) estimate, and to, for each of one or more working frequencies: cause the transmitter RF chain to transmit a transmitter RF signal to the antenna at each working frequency, cause the receiver RF chain to receive a receiver RF signal from the antenna at each working frequency, and generate first I/Q measurement data based at least in part on the received receiver RF signal and the CFO estimate. In some embodiments, the controller is further configured to cause the receiver RF chain to receive I/Q measurement information for each working frequency from the antenna. In some embodiments, the controller is further configured to generate second I/Q measurement data based at least in part on the received I/Q measurement information. In some embodiments, the controller is further configured to estimate a distance between the antenna and an antenna of another device based at least in part on the first and second I/Q measurement data.

In some embodiments, the transceiver circuit further includes a frequency synthesizer configured to control the working frequency. In some embodiments, the controller is configured to cause the frequency synthesizer to set the working frequency to a particular working frequency before causing the transmitter RF chain to transmit a particular transmitter RF signal to the antenna at the particular working frequency. In some embodiments, the controller is configured to cause the frequency synthesizer to maintain the working frequency at the a particular working frequency at least until the controller causes the receiver RF chain to receive a particular receiver RF signal from the antenna at the particular working frequency.

In some embodiments, the transceiver circuit further includes a frequency synthesizer configured to control the working frequency. In some embodiments, the controller is configured to cause the frequency synthesizer to set the working frequency to a particular working frequency before causing the receiver RF chain to receive a particular receiver RF signal from the antenna at the particular working frequency. In some embodiments, the controller is configured to cause the frequency synthesizer to maintain the working frequency at the a particular working frequency at least until the controller causes the transmitter RF chain to transmit a particular transmitter RF signal to the antenna at the particular working frequency.

In some embodiments, the controller is further configured to cause the receiver RF chain to receive a CFO RF signal from the antenna at a predetermined working frequency, and to generate the CFO estimate based at least in part on I/Q measurement data of the CFO RF signal.

In some embodiments, the one or more working frequencies includes a plurality of working frequencies spanning a frequency band of interest. In some embodiments, the predetermined working frequency is about in the middle of the frequency band of interest.

In some embodiments, the one or more working frequencies includes first and second working frequencies. In some embodiments, the first I/Q measurement data generated based in part on the receiver RF signals received at each of the first and second working frequencies are generated based in part on the same CFO estimate.

In some embodiments, the one or more working frequencies includes a plurality of working frequencies. In some embodiments, all of the first I/Q measurement data generated based on the received receiver RF signals which the distance is estimated based on, is generated based on the same CFO estimate.

In some embodiments, all of the I/Q measurement information used to generate the second I/Q measurement data is generated based on the same CFO estimate.

In some embodiments, the second I/Q measurement data is generated based in part on the same CFO estimate.

Another inventive aspect is a transceiver circuit, including an antenna, a receiver RF chain configured to receive a receiver RF signal from the antenna, a transmitter RF chain configured to transmit a transmitter RF signal to the antenna, and a controller configured to access a CFO (carrier frequency offset) estimate, and to, for each of one or more working frequencies: cause the receiver RF chain to receive a receiver RF signal from the antenna at each working frequency, generate I/Q measurement data based at least in part on the received receiver RF signal and the CFO estimate, store the I/Q measurement data, and cause the transmitter RF chain to transmit a transmitter RF signal to the antenna at each working frequency. In some embodiments, the controller is further configured to cause the transmitter RF chain to transmit the I/Q measurement data for each working frequency to the antenna.

In some embodiments, the transceiver circuit further includes a frequency synthesizer configured to control the working frequency. In some embodiments, the controller is configured to cause the frequency synthesizer to set the working frequency to a particular working frequency before causing the receiver RF chain to receive a particular receiver RF signal from the antenna at the particular working frequency. In some embodiments, the controller is configured to cause the frequency synthesizer to maintain the working frequency at the a particular working frequency at least until the controller causes the transmitter RF chain to transmit a particular transmitter RF signal to the antenna at the particular working frequency.

In some embodiments, the transceiver circuit further includes a frequency synthesizer configured to control the working frequency. In some embodiments, the controller is configured to cause the frequency synthesizer to set the working frequency to a particular working frequency before causing the transmitter RF chain to transmit a particular transmitter RF signal to the antenna at the particular working frequency. In some embodiments, the controller is configured to cause the frequency synthesizer to maintain the working frequency at the a particular working frequency at least until the controller causes the receiver RF chain to receive a particular receiver RF signal from the antenna at the particular working frequency.

In some embodiments, the controller is further configured to cause the receiver RF chain to receive a CFO RF signal from the antenna at a predetermined working frequency, and to generate the CFO estimate based at least in part on I/Q measurement data of the CFO RF signal.

In some embodiments, the one or more working frequencies includes a plurality of working frequencies spanning a frequency band of interest. In some embodiments, the predetermined working frequency is about in the middle of the frequency band of interest.

In some embodiments, the one or more working frequencies includes first and second working frequencies. In some embodiments, the I/Q measurement data generated based in part on the receiver RF signals received at each of the first and second working frequencies are generated based in part on the same CFO estimate.

In some embodiments, the one or more working frequencies includes a plurality of working frequencies. In some embodiments, all of the I/Q measurement data transmitted for each working frequency is generated based on the same CFO estimate.

Another inventive aspect is a transceiver circuit, including an antenna, a receiver RF chain configured to receive a receiver RF signal from the antenna, a transmitter RF chain configured to transmit a transmitter RF signal to the antenna, and a controller configured to, for each of one or more working frequencies: cause the transmitter RF chain to transmit a transmitter RF signal to the antenna at each working frequency, cause the receiver RF chain to receive a receiver RF signal from the antenna at each working frequency, generate a communication CFO estimate based at least in part on the received receiver RF signal, and generate first I/Q measurement data based at least in part on the received receiver RF signal and the generated communication CFO estimate. In some embodiments, the controller is further configured to cause the receiver RF chain to receive I/Q measurement information for each working frequency from the antenna. In some embodiments, the controller is further configured to generate second I/Q measurement data based at least in part on the received I/Q measurement information. In some embodiments, the controller is further configured to access a single CFO estimate. In some embodiments, the controller is further configured to revise the first and second I/Q measurement data such that the revised first and second I/Q measurement data is generated based on the single CFO estimate. In some embodiments, the controller is further configured to estimate a distance between the antenna and an antenna of another device based at least in part on the revised first and second I/Q measurement data.

In some embodiments, the transceiver circuit further includes a frequency synthesizer configured to control the working frequency. In some embodiments, the controller is configured to cause the cause the frequency synthesizer to set the working frequency to a particular working frequency before causing the transmitter RF chain to transmit a particular transmitter RF signal to the antenna at the particular working frequency. In some embodiments, the controller is configured to cause the frequency synthesizer to maintain the working frequency at the a particular working frequency at least until the controller causes the receiver RF chain to receive a particular receiver RF signal from the antenna at the particular working frequency.

In some embodiments, the controller is further configured to revise the first I/Q measurement data by removing an effect of the communication CFO estimate from the first and second I/Q measurement data.

In some embodiments, the controller is further configured to revise the first and second I/Q measurement data by including an effect of the single CFO estimate on the first and second I/Q measurement data.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1A:
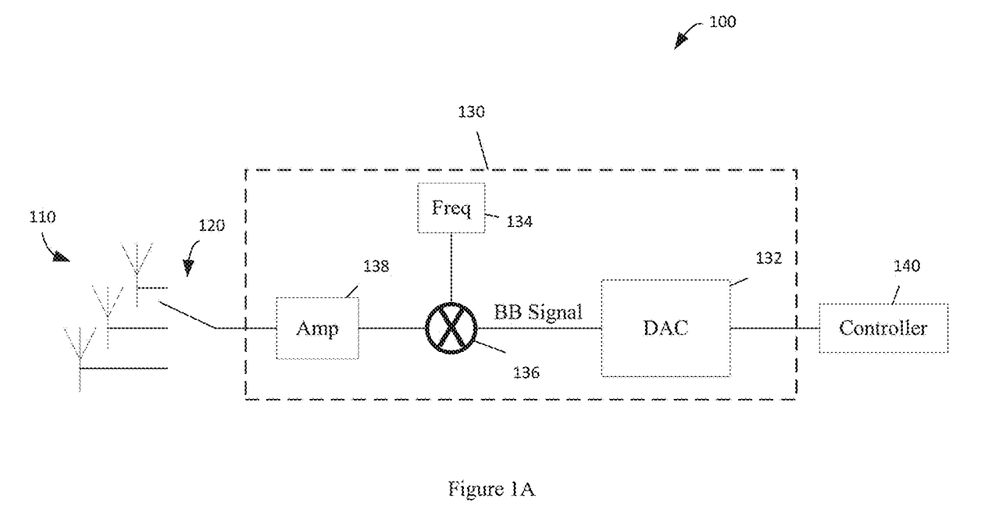
FIG. 1A is a schematic diagram of an embodiment of a transmitter circuit according to some embodiments.
Figure 1B:
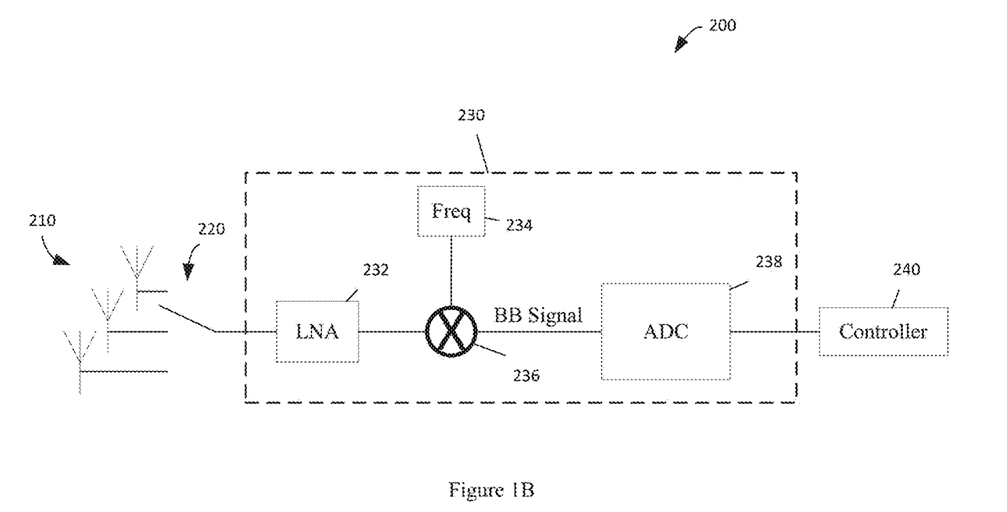
FIG. 1B is a schematic diagram of an embodiment of a receiver circuit according to some embodiments.
Figure 2:
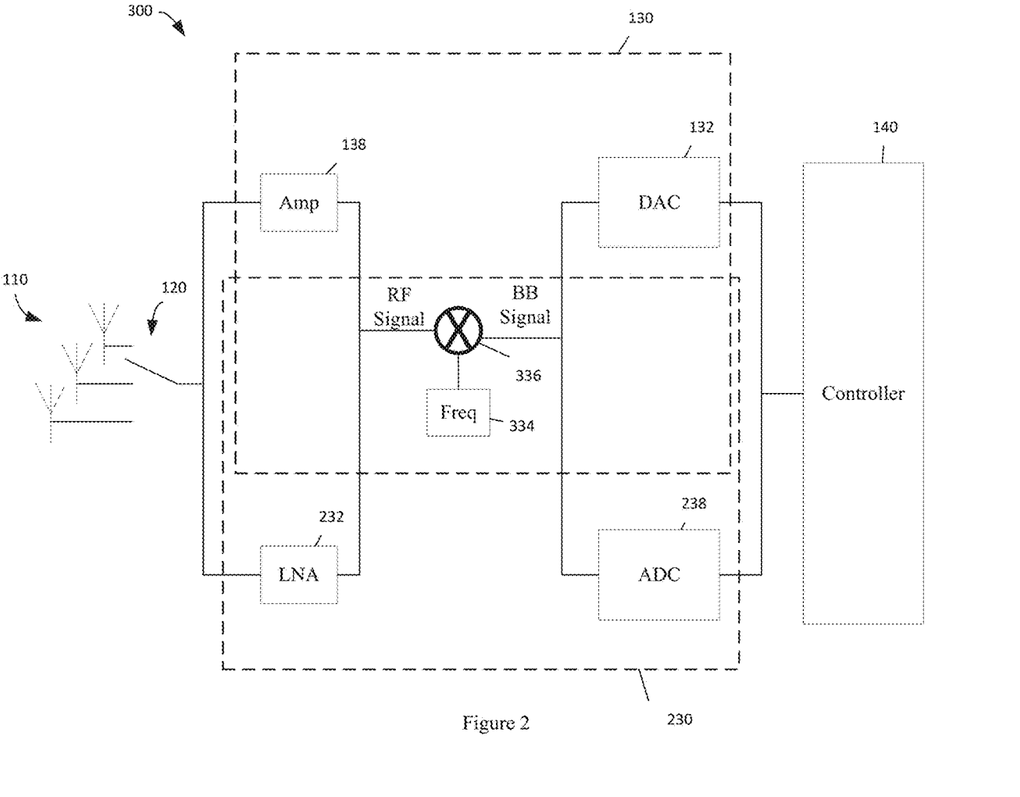
FIG. 2 is a schematic diagram of an embodiment of a transceiver circuit according to some embodiments.

Embodiments illustrate circuits and methods for determining a distance between first and second transceivers. The distances are determined using phased based methods in the presence of CFO. The distances are calculated using techniques which account for the CFO. FIGS. 1A and 1B respectively illustrate schematic diagrams of a receiver circuit and a transmitter circuit. FIG. 2 is a schematic diagram of an embodiment of a transceiver circuit according to some embodiments. FIGS. 3-8 are schematic diagrams and flowchart diagrams illustrating methods of determining a distance between first and second transceivers according to some embodiments.

FIG. 1A is a schematic diagram of an embodiment of a transmitter circuit 100 according to an embodiment. Transmitter circuit 100 includes antenna or antenna array 110, switch 120, RF chain 130, and controller 140. Transmitter circuit 100 illustrates a particular example. Other embodiments of transmitter circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays.

In embodiments where antenna or antenna array 110 includes one antenna, the one antenna may be connected directly to RF chain 130, and switch 120 may be omitted. In embodiments where antenna or antenna array 110 includes multiple antennas, each antenna may be directly connected to a separate RF chain. Each of the RF chains may have the features of RF chain 130.

Antenna or antenna array 110 may be configured to transmit RF signals to a receiver circuit, such as receiver circuit 200 described below with reference to FIG. 1B. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140.

Controller 140 is configured to provide a digital signal to RF chain 130, where the digital signal encodes the information signal to be transmitted by antenna or antenna array 110.

RF chain 130 includes digital to analog converter (DAC) 132, mixer 136, frequency synthesizer 134, and power amplifier (PA) 138. RF chain 130 is an example only, and embodiments of other RF chains may alternatively be used. For example, in some embodiments, one or more amplifiers, and/or filters may be included, as understood by those of skill in the art.

The digital signal is processed by the digital to analog converter 132 to generate an analog baseband signal (BB signal) representing the digital signal, using techniques known in the art. Various digital to analog converter structures known in the art may be used.

Mixer 136 receives the analog baseband signal output from the digital to analog converter 132 and an oscillator signal at the carrier frequency generated by frequency synthesizer 134. In response to the analog baseband signal and the oscillator signal, mixer 136 up converts the analog baseband signal from the analog-to-digital converter 132 to a high frequency signal, using techniques known in the art. Various mixer structures known in the art may be used. The resulting high frequency signal is at the carrier frequency in this modulated so as to include the information of the low frequency information signal.

Power amplifier 138 is configured to receive the high frequency signal and to drive the high frequency signal to one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 1A, control signals from controller 140 may control certain variable functionality of switch 120, power amplifier 138, frequency synthesizer 134, mixer 136, and digital to analog converter 132, for example, as understood by those of skill in the art.

The control signals from controller 140 may, for example, control switch 120 to control which of multiple antennas RF chain 130 drives the high frequency signal with.

In embodiments having multiple antennas each connected to one of multiple RF chains, controller 140 may generate control signals for each of the RF chains.

FIG. 1B is a schematic diagram of an embodiment of a receiver circuit 200 according to an embodiment. Receiver circuit 200 includes antenna or antenna array 210, switch 220, RF chain 230, and controller 240. Receiver circuit 200 illustrates a particular example. Other embodiments of receiver circuits may be used.

Antenna or antenna array 210 may be any antenna or antenna array. For example, in some embodiments, antenna or antenna array 210 includes 1, 2, 3, 4, or more antennas. In some embodiments, antenna or antenna array 210 includes a linear antenna array. In some embodiments, antenna or antenna array 210 includes a two dimensional antenna array, for example, having multiple rows of linear antenna arrays.

In embodiments where antenna or antenna array 210 includes one antenna, the one antenna may be connected directly to RF chain 230, and switch 220 may be omitted. In embodiments where antenna or antenna array 210 includes multiple antennas, each antenna may be directly connected to a separate RF chain. Each of the RF chains may have the features of RF chain 230.

Antenna or antenna array 210 may be configured to receive RF signals generated by a transmitter, such as transmitter 100 described above with reference to FIG. 1A.

RF chain 230 includes low noise amplifier (LNA) 232, frequency synthesizer 234, mixer 236, and analog to digital converter (ADC) 238. RF chain 230 is an example only, and embodiments of other RF chains may alternatively be used. For example, in some embodiments, one or more amplifiers, and/or filters may be included, as understood by those of skill in the art.

Low noise amplifier 232 is configured to receive a high frequency signal at a carrier frequency and modulated with a low frequency information signal. The high frequency signal is received from one of the antennas from antenna or antenna array 210, for example, according to a programmable electrical connection formed by switch 220, as controlled by controller 240. The high frequency signal is amplified by low noise amplifier 232 to generate an amplified RF signal, using techniques known in the art. Various low noise amplifier structures known in the art may be used.

Mixer 236 receives the amplified RF signal output from the low noise amplifier 232 and an oscillator signal at or substantially at the carrier frequency generated by frequency synthesizer 234. In response to the amplified RF signal and the oscillator signal, mixer 236 down converts the amplified RF signal from the low noise amplifier 232 to a baseband signal, using techniques known in the art. Various mixer structures known in the art may be used. The resulting baseband signal includes information of the low frequency information signal.

The baseband signal is then processed by the analog-to-digital converter 238 to generate a digital signal representing the baseband signal, using techniques known in the art. Various analog-to-digital converter structures known in the art may be used.

Controller 240 receives the digital representation of the baseband signal.

As understood by those of skill in the art, using communication connectivity not illustrated in FIG. 1B, control signals from controller 240 may control certain variable functionality of switch 220, low noise amplifier 232, frequency synthesizer 234, mixer 236, and analog-to-digital converter 238, for example, as understood by those of skill in the art.

The control signals from controller 240 may, for example, control switch 220 to select which of multiple antennas RF chain 230 receives the high frequency signals from.

For example, controller 240 may generate control signals which result in controller 240 receiving a group of digital signals, where each digital signal of the group is generated by RF chain 230 based on a high frequency signal received by a selected one of the antennas. In embodiments having multiple antennas each connected to one of multiple RF chains, controller 240 may generate control signals for each of the RF chains, such that controller 240 receives a group of digital signals, where each digital signal of the group is generated by one of the RF chains based on an RF signal received by the particular antenna connected thereto.

FIG. 2 is a schematic diagram of an embodiment of a transceiver circuit 300 according to some embodiments. Transceiver circuit 300 includes antenna or antenna array 110, switch 120, receiver RF chain 130, transmitter RF chain 230, and controller 140. Transceiver circuit 300 illustrates a particular example. Other embodiments of transceiver circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays.

In embodiments where antenna or antenna array 110 includes one antenna, the one antenna may be connected directly to transmitter RF chain 130 and receiver RF chain 230, and switch 120 may be omitted. In embodiments where antenna or antenna array 110 includes multiple antennas, each antenna may be directly connected to a separate receiver RF chain. Each of the receiver RF chains may have the features of receiver RF chain 130. In embodiments where antenna or antenna array 110 includes multiple antennas, each antenna may be directly connected to a separate transmitter RF chain. Each of the transmitter RF chains may have the features of transmitter RF chain 230.

Antenna or antenna array 110 may be configured to transmit RF signals to a receiver circuit, such as receiver circuit 200, or to another transceiver circuit. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140.

Controller 140 is configured to provide a digital signal to RF chain 130, where the digital signal encodes the information signal to be transmitted by antenna or antenna array 110.

RF chain 130 includes digital to analog converter (DAC) 132, bidirectional mixer 336, frequency synthesizer 334, and power amplifier (PA) 138. RF chain 130 is an example only, and embodiments of other RF chains may alternatively be used. For example, in some embodiments, one or more amplifiers, and/or filters may be included, as understood by those of skill in the art.

The digital signal is processed by the digital to analog converter 132 to generate an analog baseband signal (BB signal) representing the digital signal, using techniques known in the art. Various digital to analog converter structures known in the art may be used.

Bidirectional mixer 336 receives the analog baseband signal output from the digital to analog converter 132 and an oscillator signal at the carrier frequency generated by frequency synthesizer 334. In response to the analog baseband signal and the oscillator signal, bidirectional mixer 336 up converts the analog baseband signal from the analog-to-digital converter 132 to a high frequency signal, using techniques known in the art. Various mixer structures known in the art may be used. The resulting high frequency signal is at the carrier frequency in this modulated so as to include the information of the low frequency information signal.

Power amplifier 138 is configured to receive the high frequency signal, and to drive the high frequency signal is one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 2, control signals from controller 140 may control certain variable functionality of switch 120, power amplifier 138, frequency synthesizer 134, bidirectional mixer 336, and digital to analog converter 132, to cause transceiver circuit 300 to transmit data with RF signals, for example, as understood by those of skill in the art.

The control signals from controller 140 may, for example, control switch 120 to control which of multiple antennas RF chain 130 drives the high frequency signal with.

In embodiments having multiple antennas each connected to one of multiple transmitter RF chains, controller 140 may generate control signals for each of the transmitter RF chains.

In embodiments where antenna or antenna array 110 includes one antenna, the one antenna may be connected directly to receiver RF chain 230, and switch 120 may be omitted. In embodiments where antenna or antenna array 110 includes multiple antennas, each antenna may be directly connected to a separate receiver RF chain. Each of the receiver RF chains may have the features of receiver RF chain 230.

Antenna or antenna array 110 may be configured to receive RF signals generated by a transmitter, such as transmitter 100 or from another transceiver circuit.

RF chain 230 includes low noise amplifier (LNA) 232, frequency synthesizer 334, bidirectional mixer 336, and analog to digital converter (ADC) 238. RF chain 230 is an example only, and embodiments of other RF chains may alternatively be used. For example, in some embodiments, one or more amplifiers, and/or filters may be included, as understood by those of skill in the art.

Low noise amplifier 232 is configured to receive a high frequency signal at a carrier frequency and modulated with a low frequency information signal. The high frequency signal is received from one of the antennas from antenna or antenna array 110, for example, according to a programmable electrical connection formed by switch 120, as controlled by controller 140. The high frequency signal is amplified by low noise amplifier 232 to generate an amplified RF signal, using techniques known in the art. Various low noise amplifier structures known in the art may be used.

Bidirectional mixer 336 receives the amplified RF signal output from the low noise amplifier 232 and an oscillator signal at or substantially at the carrier frequency generated by frequency synthesizer 334. In response to the amplified RF signal and the oscillator signal, bidirectional mixer 336 down converts the amplified RF signal from the low noise amplifier 232 to a baseband signal, using techniques known in the art. Various mixer structures known in the art may be used. The resulting baseband signal includes information of the low frequency information signal.

The baseband signal is then processed by the analog-to-digital converter 238 to generate a digital signal representing the baseband signal, using techniques known in the art. Various analog-to-digital converter structures known in the art may be used.

Controller 140 receives the digital representation of the baseband signal.

As understood by those of skill in the art, using communication connectivity not illustrated in FIG. 2, control signals from controller 240 may control certain variable functionality of switch 120, low noise amplifier 232, frequency synthesizer 334, bidirectional mixer 336, and analog-to-digital converter 238, to cause transceiver circuit 300 to receive data from RF signals, for example, as understood by those of skill in the art.

The control signals from controller 140 may, for example, control switch 120 to select which of multiple antennas receiver RF chain 230 receives the high frequency signals from.

For example, controller 140 may generate control signals which result in controller 140 receiving a group of digital signals, where each digital signal of the group is generated by receiver RF chain 230 based on a high frequency signal received by a selected one of the antennas. In embodiments having multiple antennas each connected to one of multiple receiver RF chains, controller 140 may generate control signals for each of the receiver RF chains, such that controller 140 receives a group of digital signals, where each digital signal of the group is generated by one of the receiver RF chains based on an RF signal received by the particular antenna connected thereto.

Figure 3:
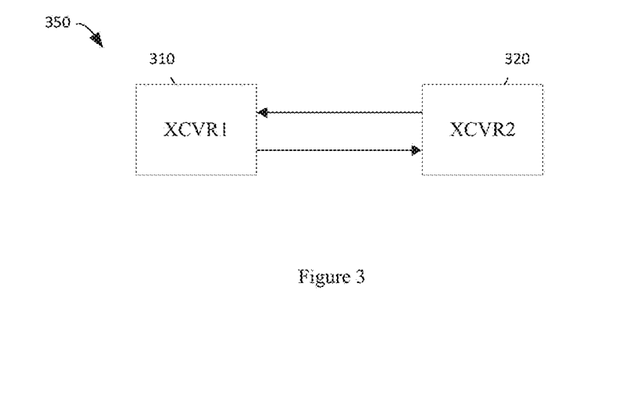
FIG. 3 is schematic diagram of first and second transceivers communicating wirelessly.

FIG. 3 is schematic diagram of a system 350 having first and second transceiver circuits 310 and 320 communicating wirelessly. Instantiations of transceiver circuit 300 may be used as either or both of first and second transceiver circuits 310 and 320. Each of first and second transceiver circuits 310 and 320 may have features similar or identical to that of transceiver circuit 300, discussed with reference to FIG. 2. Other transceiver circuits may be used as either or both of first and second transceiver circuits 310 and 320.

In some embodiments, it may be advantageous for first transceiver circuit 310 to determine a distance between first and second transceiver circuits 310 and 320. Additionally or alternatively, it may be advantageous for second transceiver circuit 320 to determine a distance between first and second transceiver circuits 310 and 320.

Three methods for distance estimation may be used: Received Signal Strength Indicator (RSSI)-based, time-based, and phase-based measurements.

In RSSI-based methods, the receiver of the signal will calculate its distance to the transmitter based on the attenuation of the transmitted signal over the distance. RSSI-based solutions are very sensitive to multipath fading and other environmental influences such as humidity. In some time-based solutions, the transit time of the signal may be measured directly. Therefore, these methods require highly synchronized clocks to calculate the time between departure and arrival which is impossible in many systems. Moreover, time-based solutions may use a large signal bandwidth in order to have acceptable accuracy in multipath environments, which is incompatible with many narrowband technologies such as Bluetooth Low-Energy (BLE).

In phase-based methods, the amount of signal-phase shifts between transmitter and receiver may be used to calculate the distance between them. In order to mitigate the error due to multipath problem, the phase changes may be measured over multiple frequencies to calculate the distance between them. This procedure is called Multi-Carrier Phase Difference (MCPD). For the MCPD distance estimation, two roles are defined:

Initiator: The device that starts the estimation procedure.
Reflector: The device that responds to the initiator.

Based on how initiator and reflector interact, there are at least two different ways to implement MCPD: One-Way and Two-Way.

One-Way MCPD: The initiator sends continuous Wave (CW) signals to Reflector across the frequency band of interest with a predefined frequency step. The received signals at the reflector are used to estimate the distance between the two devices. This method has errors related to phase incoherency over the whole frequency band of interest.

Two-Way MCPD: The initiator and reflector exchange CW signals at different frequencies across the frequency band of interest in a back and forth ping pong fashion. This method has errors related to phase incoherency only over each individual ping pong communication from initiator to reflector and vice versa, rather than over the whole frequency band of interest.

In the discussion below, the example embodiments illustrate Two-Way MCPD (TWMCPD) method. As understood by those of skill in the art, the principles may also be applied to one-way MCPD.

The TWMCPD method may have three main stages:

Frequency sweep: Initiator and reflector send CW signals to each other at different channel frequencies across the frequency band of interest.

Data transfer (IQ samples transfer): The reflector sends all its received IQ samples back to the initiator.

Distance Estimation: The initiator uses the data to estimate the distance.

Carrier frequency offset (CFO) affects the accuracy in the distance estimation, as outlined below.

The following notation is used:

The distance or range between the initiator and the reflector is r.
The initiator has crystal offset of $\mu_i$.
The reflector has crystal offset of $\mu_r$.
The phase difference between the LO signal of the initiator and the reflector at the start of ranging procedure is $\theta_0$.
The time offset between the initiator and the reflector at the start of ranging procedure is M.
The delay between the transmitted and received tones by the reflector is $T_0$.

$\Delta T_0$ is the variation in $T_0$ between different signal exchanges.

The time difference between the tone exchange in channel $f_k$ and the tone exchange in the next channel $f_k+1$ is $T_f$.

At least because of CFO, there is a frequency offset of F between initiator and reflector.

The Initiator transmits a CW, to the reflector on the first channel, $f_0$. The reflector then performs I/Q measurement on the received carrier, where $\Delta t$ is a time-offset between the initiator and reflector, the phase of the received CW at the reflector is $$\varphi_R(f_0, r) = 2\pi(1 + \mu_i)f_0\left(\frac{r}{C} - \Delta t\right) - \theta_0 \ (\text{mod } 2\pi),$$

Where $\theta$ is the phase difference between the LO signal of the initiator and LO signal of the reflector at the start of the ranging procedure.

Following this, the reflector sends back a CW on the same channel, to the initiator. At the initiator, the phase of the received signal is $$\varphi_I(f_0, r) = 2\pi(1 + \mu_r)(f_0 + F)\left(\frac{r}{C} + \Delta t\right) + \theta_0 + \theta'_0(\text{mod } 2\pi),$$

Where $$\theta_0' = 2\pi[(1+\mu_r)(f_0+F)-(1+\mu_i)(f_0)]T_0,$$

The initiator sums up the two phases (using its own IQ samples and the IQ samples sent from the reflector):

$$\varphi_{I+R}(f_0, r) = 4\pi f_0 \frac{r}{C} + 2\pi(\mu_i + \mu_r)f_0\frac{r}{C} + 2\pi F\left(\frac{r}{C} + \Delta t\right) +$$
$$2\pi \mu_r F \frac{r}{C} + 2\pi \Delta t(\mu_r(f_0 + F) - \mu_i f_0) + \theta'_0(\text{mod } 2\pi)$$

The equation can be used to estimate the range, but because of the half-wavelength ambiguity, the maximum range ($c/2f_0$) is very small. In order to resolve this issue, this method is implemented at two or more frequencies and results are then subtracted.

For a second frequency, $$\varphi_R(f_1, r) = 2\pi(1 + \mu_i)f_1\left(\frac{r}{C} - \Delta t - (\mu_r - \mu_i)T_F\right) - \theta_1 \ (\text{mod } 2\pi)$$

$$\varphi_I(f_1, r) = 2\pi(1 + \mu_r)(f_1 + F)\left(\frac{r}{C} + \Delta t + (\mu_r - \mu_i)T_f\right) + \theta_1 + \theta'_1(\text{mod } 2\pi)$$

Where $$\theta_1' = 2\pi[(1+\mu_r)(f_1+F)-(1+\mu_i)(f_1)](T_0+\Delta T_0)$$

The phase $\varphi_{I+R}$ for the second frequency is:

$$\varphi_{I+R}(f_1, r) = 4\pi f_1 \frac{r}{C} + 2\pi(\mu_i + \mu_r)f_1\frac{r}{C} + 2\pi F\left(\frac{r}{C} + \Delta t + (\mu_r - \mu_i)T_f\right) +$$
$$2\pi \mu_r F \frac{r}{C} + 2\pi(\Delta t + (\mu_r - \mu_i)T_f)(\mu_r(f_1 + F) - \mu_i f_1) + \theta'_1(\text{mod } 2\pi)$$

Accordingly:

$$\Delta \varphi = \varphi_{I+R}(f_1, r) - \varphi_{I+R}(f_0, r) = \frac{4\pi \Delta f}{C}r + 2\pi \Delta f(\mu_i + \mu_r)\frac{r}{C} +$$
$$2\pi \Delta t(\mu_r - \mu_i)\Delta f + 2\pi(\mu_r - \mu_i)T_f((1 + \mu_r)F + (\mu_r - \mu_i)f_1) +$$
$$2\pi(\mu_r - \mu_i)\Delta f T_0 + 2\pi[(\mu_r - \mu_i)f_1 + (1 + \mu_r)F]\Delta T_0$$

and the estimated range is:

$$\hat{r} = \frac{C}{4\pi \Delta f}\Delta \varphi \left(\text{mod } \frac{C}{2\Delta f}\right)$$

Therefore, the ambiguity will depend on the frequency difference of both tones.

The estimation error is:

$$e = r - \hat{r} =$$
$$0.5C\left[(\mu_i + \mu_r)\frac{r}{C} + \Delta t(\mu_r - \mu_i) + (\mu_r - \mu_i)\left((1 + \mu_r)\frac{F}{\Delta f} + (\mu_r - \mu_i)\frac{f_1}{\Delta f}\right) \right.$$
$$\left. T_f + (\mu_r - \mu_i)T_0 + \left((1 + \mu_r)\frac{F}{\Delta f} + (\mu_r - \mu_i)\frac{f_1}{\Delta f}\right)\Delta T_0\right]$$

The error due to CFO is:

Error due to $CFO =$ $$0.5C\left[(\mu_r - \mu_i)\left((1 + \mu_r)\frac{F}{\Delta f}\right)T_f + \left((1 + \mu_r)\frac{F}{\Delta f}\right)\Delta T_0\right] \approx 0.5C\frac{F}{\Delta f}\Delta T_0$$

Considering that it is near impossible to make $\Delta T_0$ zero, for example, in BLE systems $\Delta T_0$ is in the order of 1 μs, F results in significant error. As an example for $\Delta T_0=0.5$ μs and $\Delta f=2$ MHz, the CFO of 50 KHz results in an estimation error of 1.875 meters.

Figure 4:
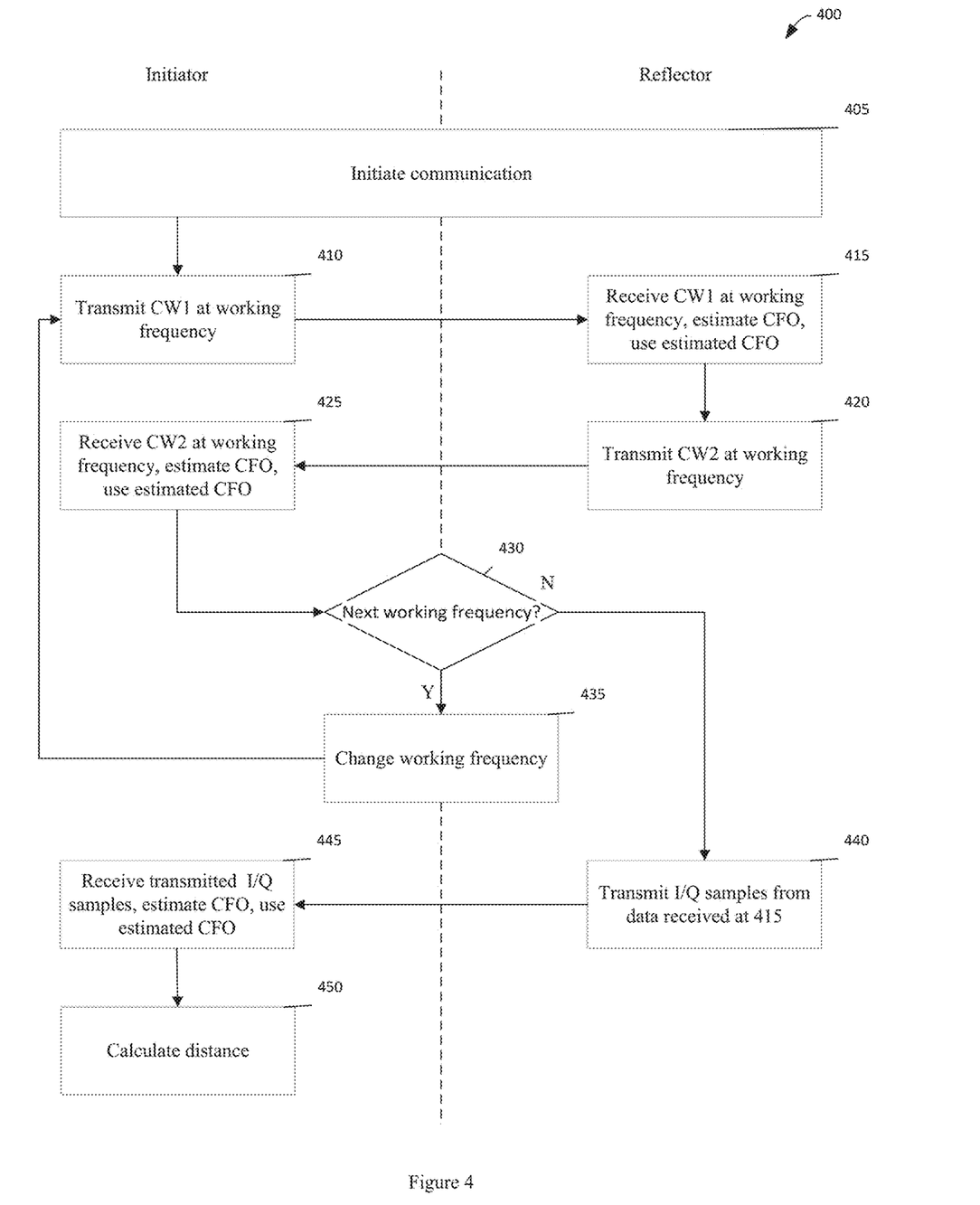
FIG. 4 is a flowchart diagram illustrating a method of determining a distance between first and second transceivers according to some embodiments.

FIG. 4 is a flowchart diagram illustrating a TWMCPD method 400 of determining a distance between first and second transceivers according to some embodiments. Method 400 may be performed by first and second transceiver circuits 310 and 320.

At 405, in response to determining that a distance between the first and second transceiver circuits 310 and 320 is needed or desired, one of the first and second transceiver circuits 310 and 320 communicates with the other of first and second transceiver circuits 310 and 320. The communication may request that the method of 400 be performed. The communication between the first and second transceiver circuits 310 and 320 identifies the one of the first and second transceiver circuits 310 and 320 as the initiator and the other of the first and second transceiver circuits 310 and 320 as the reflector. In addition, the communication between the first and second transceiver circuits 310 and 320 specifies the frequency band of interest and the particular channel frequencies for the back and forth ping pong communications which will be used for the initiator to determine the distance. The communication may specify other conditions for the distance determination process.

At 410, the initiator transceiver circuit transmits a first continuous wave or other signal as a first initiation signal to the to the reflector transceiver circuit at a first working frequency of the frequency band of interest. In some embodiments, either or both of the first working frequency and the frequency band of interest were communicated at 405. In some embodiments, either or both of the first working frequency and the frequency band of interest are specified by a communications standard.

At 415, the reflector transceiver circuit receives the first continuous wave or other signal from the initiator transceiver circuit at the first working frequency. In addition, the reflector transceiver circuit estimates the carrier frequency offset (CFO). Any method of CFO estimation may be used. For example, the reflector transceiver circuit may find a phase difference between two points of a signal with known time difference, and determine a frequency based on the phase difference, where the frequency=(phase difference)/ (2*pi*time difference).

At 415, the reflector transceiver circuit also performs I/Q measurement on the received continuous wave or other signal using the CFO estimate of 415 to compensate for the CFO of the communication.

At 420, the reflector transceiver circuit transmits a second continuous wave or other signal as a first reflection signal to the initiator transceiver circuit at the first working frequency of the frequency band of interest.

In some embodiments, a frequency synthesizer controlling the working frequency for both the receive action of 415 and the transmit action of 420 is set before 415 and is not reset between 415 and 420. Accordingly, a locking circuit, such as a PLL or a DLL, of the frequency synthesizer may be locked before 415 and remain locked throughout 415 and 420.

At 425, the initiator transceiver circuit receives the second continuous wave or other signal from the reflector transceiver circuit at the first working frequency. In addition, the initiator transceiver circuit estimates the carrier frequency offset (CFO). Any method of CFO estimation may be used. At 425, the initiator transceiver circuit also performs I/Q measurement on the received continuous wave or other signal using the estimated CFO to compensate for the CFO in the communication.

In some embodiments, a frequency synthesizer controlling the working frequency for both the transmit action of 410 and the receive action of 425 is set before 410 and is not reset between 410 and 425. Accordingly, a locking circuit, such as a PLL or a DLL, of the frequency synthesizer may be locked before 410 remain locked throughout 410 and 425.

In some embodiments, the order of operations is different. For example, in some embodiments, 420 occurs after 405, 425 occurs after 420, 410 occurs after 425, 415 occurs after 410, and 430 occurs after 415.

At 430, if another working frequency of the frequency band of interest is to be used, at 435, the working frequency is changed, and the method 400 returns to 410. Any total number of working frequencies may be used.

Otherwise, if another working frequency of the frequency band of interest is not to be used, at 440, the reflector transceiver circuit transmits data representing the I/Q measurements made at all occurrences of 415 to the initiator transceiver circuit. The working frequency of the transmission may be the last working frequency used at 410, 415, 420, and 425. In some embodiments, the working frequency of the transmission is another frequency, for example, of the frequency band of interest. The other frequency may have been communicated at 405. In some embodiments, the other frequency is specified by a communications standard.

At 445, the initiator transceiver circuit receives the data transmitted by the reflector transceiver circuit at 440. The initiator transceiver circuit receives the data transmitted from the reflector transceiver circuit at the working frequency. In addition, the initiator transceiver circuit estimates the carrier frequency offset (CFO). Any method of CFO estimation may be used. At 445, the initiator transceiver circuit also performs I/Q measurement on the received transmission using the estimated CFO to compensate for the CFO in the communication.

At 450, the initiator transceiver circuit estimates the distance between the initiator transceiver circuit and the reflector transceiver circuit based on the I/Q data received from the reflector transceiver circuit at 445 and generated at the occurrences of 425. For example, the distance may be estimated according to the equation shown above:

$$\hat{r} = \frac{C}{4\pi\Delta f}\Delta\varphi\left(\mathrm{mod}\frac{C}{2\Delta f}\right)$$

Figure 5:
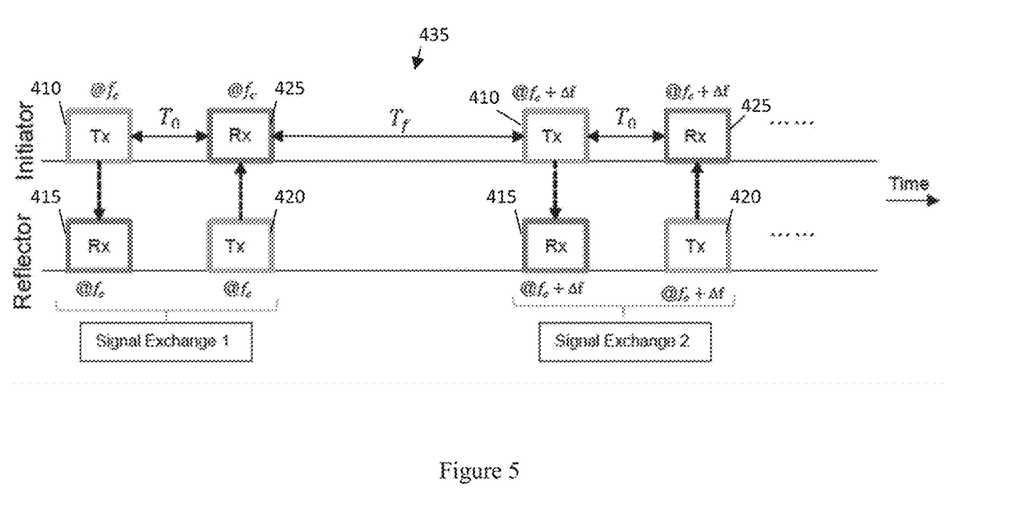
FIG. 5 is a schematic diagram representing the actions of the first and second transceivers performing certain portions of the method of FIG. 4 according to some embodiments.

FIG. 5 is a schematic diagram representing the actions of the first and second transceivers performing certain portions of the method of FIG. 4 according to some embodiments.

As illustrated, first and second signal exchanges are represented, where each signal exchange includes:

the initiator circuit transmitting a $1^{st}$ signal at a working frequency, at 410;

the reflector circuit receiving the $1^{st}$ signal at the working frequency, at 415;

after a time $T_0$, the reflector circuit transmitting a $2^{nd}$ signal at the working frequency, at 420; and the initiator circuit receiving the $2^{nd}$ signal at the working frequency, at 425.

As illustrated, the working frequency of the first signal exchange 1 is fc, and the working frequency of the second signal exchange 2 is fc+$\Delta$f. In addition, FIG. 5 illustrates that the second signal exchange 2 happens a time $T_f$ after the first signal exchange 1, where during time $T_f$, the working frequency of the initiator circuit and the reflector circuit is changed from fc to fc+$\Delta$f, at 435.

Figure 6:
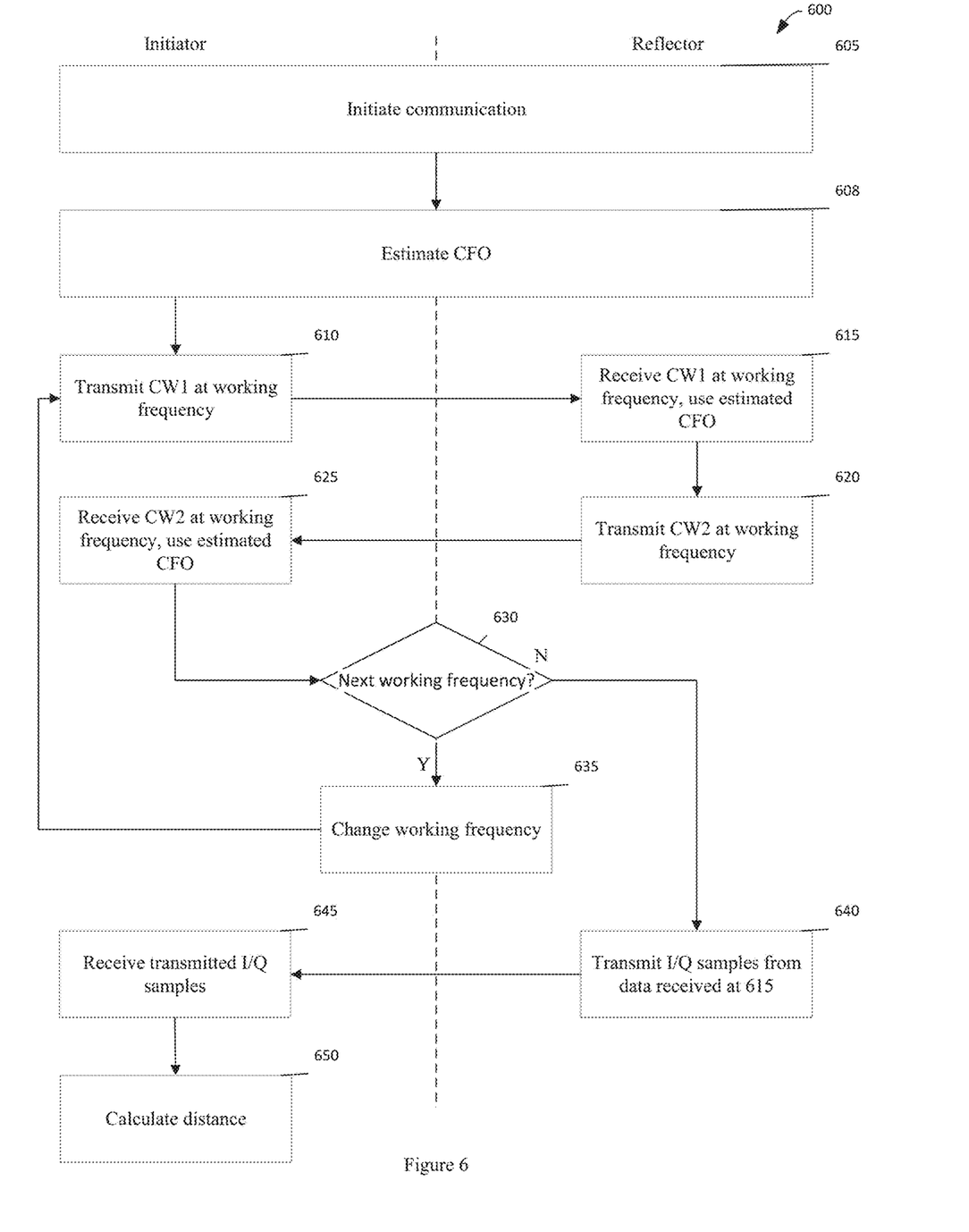
FIG. 6 is a flowchart diagram illustrating a method of determining a distance between first and second transceivers according to some embodiments.

FIG. 6 is a flowchart diagram illustrating a TWMCPD method 600 of determining a distance between first and second transceivers according to some embodiments. Method 600 may be performed by first and second transceiver circuits 310 and 320.

At 605, in response to determining that a distance between the first and second transceiver circuits 310 and 320 is needed or desired, one of the first and second transceiver circuits 310 and 320 communicates with the other of first and second transceiver circuits 310 and 320. The communication may request that the method of 600 be performed. The communication between the first and second transceiver circuits 310 and 320 identifies the one of the first and second transceiver circuits 310 and 320 as the initiator and the other of the first and second transceiver circuits 310 and 320 as the reflector. In addition, the communication between the first and second transceiver circuits 310 and 320 specifies the frequency band of interest and the particular channel frequencies for the back and forth ping pong communications which will be used for the initiator to determine the distance. The communication may specify other conditions for the distance determination process.

At 608, a CFO estimate is made. Any method of CFO estimation may be used. For example, method 400 may be used to determine the CFO estimate. In some embodiments, the CFO estimate is made as part of one or more communications occurring as part of 605. In some embodiments, the CFO estimate is made as part of one or more communications occurring prior to 605. In some embodiments, the CFO estimate is made as part of one or more communications occurring as part of 610 and 615, or as part of 620 and 625, discussed below. In some embodiments, the CFO estimate is made as part of one or more communications occurring as part of 610, 615, 620 and 625, discussed below.

In some embodiments, the CFO estimate is made at 608 based on a single transmission at a particular working frequency from the reflector transceiver circuit to the initiator transceiver circuit or from the initiator transceiver circuit to the reflector transceiver circuit. In some embodiments, the CFO estimate is made based on a single signal exchange at a particular working frequency between the reflector transceiver circuit and the initiator transceiver circuit, similar or identical to either of the first and second signal exchanges illustrated in FIG. 5.

In some embodiments, the particular working frequency used for the communication for the CFO estimate is the first working frequency of the signal exchanges which include 610, 615, 620, and 625, discussed below. In some embodiments, the particular working frequency is another of the working frequencies of the signal exchanges which include 610, 615, 620, and 625. In some embodiments, the particular working frequency is equal to or about equal to a middle frequency of the frequency band of interest. For example, the difference between the particular working frequency and the middle frequency of the frequency band of interest may be less than 1%, 2%, 3%, 5%, 10%, 15%, or 20% of the frequency band of interest.

At 610, the initiator transceiver circuit transmits a first continuous wave or other signal as an initiation signal to the reflector transceiver circuit at a first working frequency of the frequency band of interest. In some embodiments, either or both of the first working frequency and the frequency band of interest were communicated at 605. In some embodiments, either or both of the first working frequency and the frequency band of interest are specified by a communications standard.

At 615, the reflector transceiver circuit receives the first continuous wave or other signal from the initiator transceiver circuit at the first working frequency. The reflector transceiver circuit also performs I/Q measurement on the received continuous wave or other signal using the CFO estimate of 608 to compensate for the CFO of the communication.

At 620, the reflector transceiver circuit transmits a second continuous wave or other signal as an reflection signal of to the initiator transceiver circuit at the first working frequency of the frequency band of interest.

In some embodiments, a frequency synthesizer controlling the working frequency for both the receive action of 615 and the transmit action of 620 is set before 615 and is not reset between 615 and 620. Accordingly, a locking circuit, such as a PLL or a DLL, of the frequency synthesizer may be set before 615 and remain locked throughout 615 and 620.

At 625, the initiator transceiver circuit receives the second continuous wave or other signal from the reflector transceiver circuit at the first working frequency. The initiator transceiver circuit also performs I/Q measurement on the received continuous wave or other signal using the CFO estimate of 608 to compensate for the CFO of the communication.

In some embodiments, a frequency synthesizer controlling the working frequency for both the transmit action of 610 and the receive action of 625 is set before 610 and is not reset between 610 and 625. Accordingly, a locking circuit, such as a PLL or a DLL, of the frequency synthesizer may be locked before 610 and remain locked throughout 610 and 625.

In some embodiments, the order of operations is different. For example, in some embodiments, 620 occurs after 605, 625 occurs after 620, 610 occurs after 625, 615 occurs after 610, and 630 occurs after 615.

At 630, if another working frequency of the frequency band of interest is to be used, at 635, the working frequency is changed, and the method 600 returns to 610. Any total number of working frequencies may be used.

Otherwise, if another working frequency of the frequency band of interest is not to be used, at 640, the reflector transceiver circuit transmits data representing the I/Q measurements made at all occurrences of 615 to the initiator transceiver circuit. The working frequency of the transmission may be the last working frequency used at 610, 615, 620, and 625. In some embodiments, the working frequency of the transmission is another frequency, for example, of the frequency band of interest. The other frequency may have been communicated at 605. In some embodiments, the other frequency is specified by a communications standard.

At 645, the initiator transceiver circuit receives the data transmitted by the reflector transceiver circuit at 640. The initiator transceiver circuit may receive the data transmitted from the reflector transceiver circuit at the working frequency. The initiator transceiver circuit also performs I/Q measurement on the received transmission. In some embodiments, initiator transceiver circuit also performs I/Q measurement on the received transmission using the CFO estimate of 608 to compensate for the CFO in the communication. In some embodiments, initiator transceiver circuit also performs I/Q measurement on the received transmission using another CFO estimate to compensate for the CFO in the communication.

At 650, the initiator transceiver circuit estimates the distance between the initiator transceiver circuit and the reflector transceiver circuit based on the I/Q data received from the reflector transceiver circuit at 645 and generated at the occurrences of 625. Any method of estimating the distance may be used. For example, any methods of estimating the distance discussed herein may be used.

Figure 7:
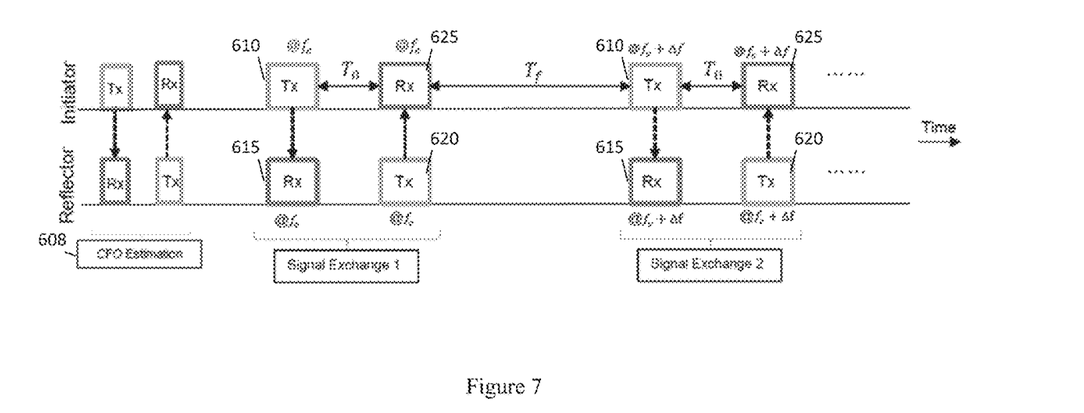
FIG. 7 is a schematic diagram representing the actions of the first and second transceivers performing certain portions of the method of FIG. 6 according to some embodiments.

FIG. 7 is a schematic diagram representing the actions of the first and second transceivers performing certain portions of the method of FIG. 6 according to some embodiments.

As illustrated, CFO estimation 608 is represented, where, in this embodiment, CFO estimation 608 includes:

the initiator circuit transmitting a 1st signal;
the reflector circuit receiving the $1^{st}$ signal;
the reflector circuit transmitting a $2^{nd}$ signal; and
the initiator circuit receiving the $2^{nd}$ signal.

As illustrated, first and second signal exchanges are represented, where each signal exchange includes:

the initiator circuit transmitting a $1^{st}$ signal at a working frequency, at 610;
the reflector circuit receiving the $1^{st}$ signal at the working frequency, at 615;
after a time $T_0$, the reflector circuit transmitting a $2^{nd}$ signal at the working frequency, at 620; and
the initiator circuit receiving the $2^{nd}$ signal at the working frequency, at 625.

As illustrated, the working frequency of the first signal exchange 1 is fc, and the working frequency of the second signal exchange 2 is fc+Δf. In addition, FIG. 7 illustrates that the second signal exchange 2 happens a time $T_f$ after the first signal exchange 1, where during time $T_f$, the working frequency of the initiator circuit and the reflector circuit is changed from fc to fc+Δf.

Figure 8:
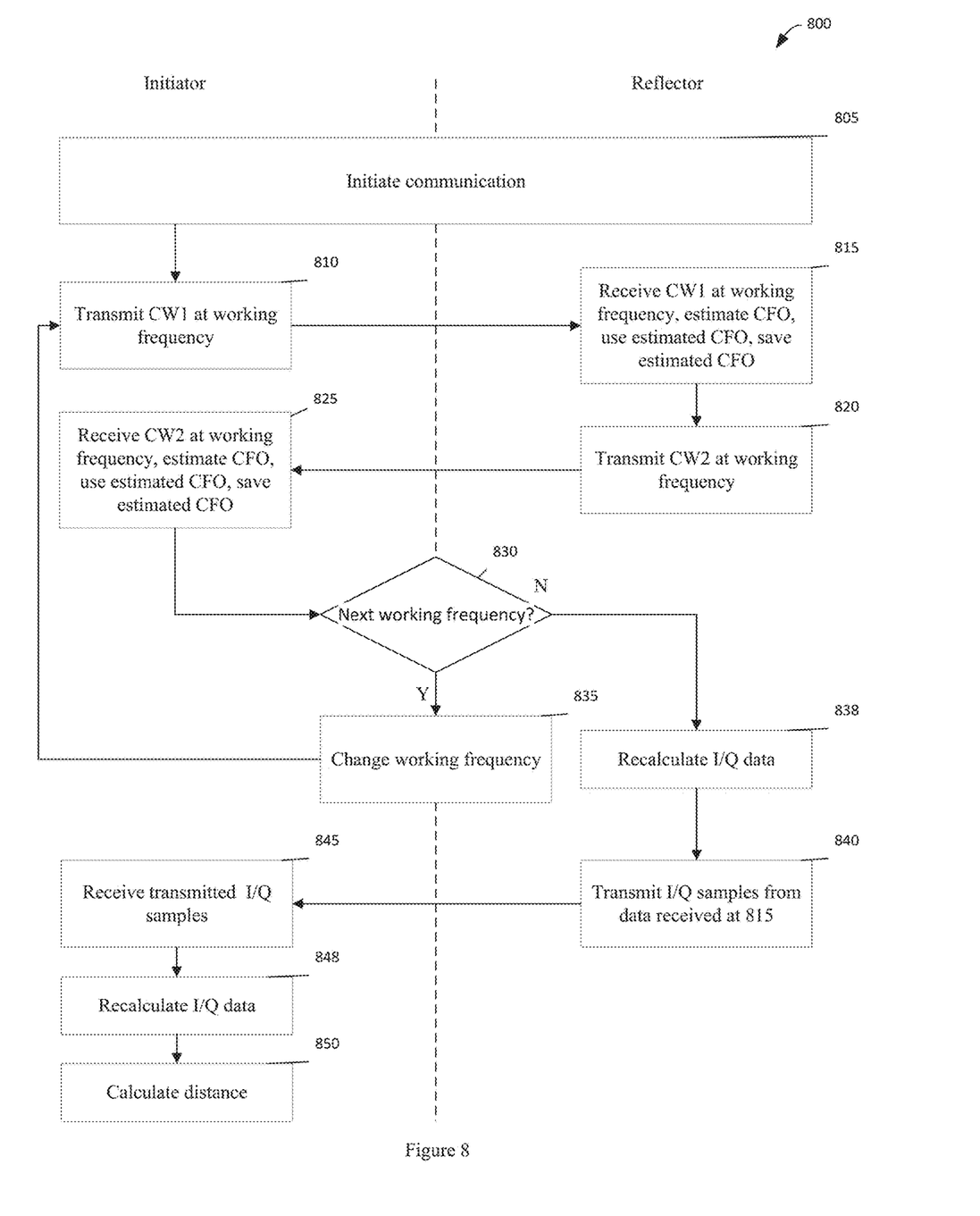
FIG. 8 is a flowchart diagram illustrating a method of determining a distance between first and second transceivers according to some embodiments.

FIG. 8 is a flowchart diagram illustrating a TWMCPD method 800 of determining a distance between first and second transceivers according to some embodiments. Method 800 may be performed by first and second transceiver circuits 310 and 320.

At 805, in response to determining that a distance between the first and second transceiver circuits 310 and 320 is needed or desired, one of the first and second transceiver circuits 310 and 320 communicates with the other of first and second transceiver circuits 310 and 320. The communication may request that the method of 800 be performed. The communication between the first and second transceiver circuits 310 and 320 identifies the one of the first and second transceiver circuits 310 and 320 as the initiator and the other of the first and second transceiver circuits 310 and 320 as the reflector. In addition, the communication between the first and second transceiver circuits 310 and 320 specifies the frequency band of interest and the particular channel frequencies for the back and forth ping pong communications which will be used for the initiator to determine the distance. The communication may specify other conditions for the distance determination process.

At 810, the initiator transceiver circuit transmits a first continuous wave or other signal as an initiation signal to the reflector transceiver circuit at a first working frequency of the frequency band of interest. In some embodiments, either or both of the first working frequency and the frequency band of interest were communicated at 805. In some embodiments, either or both of the first working frequency and the frequency band of interest are specified by a communications standard.

At 815, the reflector transceiver circuit receives the first continuous wave or other signal from the initiator transceiver circuit at the first working frequency. In addition, the reflector transceiver circuit estimates the carrier frequency offset (CFO). Any method of CFO estimation may be used. For example, the reflector transceiver circuit may find a phase difference between two points of a signal with known time difference, and determine a frequency based on the phase difference, where the frequency=(phase difference)/(2*pi*time difference).

At 815, the reflector transceiver circuit also performs I/Q measurement on the received continuous wave or other signal using the CFO estimate of 815 to compensate for the CFO of the communication. In addition, the reflector transceiver circuit also saves the CFO estimate and the I/Q measurement data of 815 in a memory so it can be used later, as described below with reference to 848.

At 820, the reflector transceiver circuit transmits a second continuous wave or other signal as an reflection signal to the initiator transceiver circuit at the first working frequency of the frequency band of interest.

In some embodiments, a frequency synthesizer controlling the working frequency for both the receive action of 815 and the transmit action of 820 is set before 815 and is not reset between 815 and 820. Accordingly, a locking circuit, such as a PLL or a DLL, of the frequency synthesizer may be set before 815 and remain locked throughout 815 and 820.

At 825, the initiator transceiver circuit receives the second continuous wave or other signal from the reflector transceiver circuit at the first working frequency. In addition, the initiator transceiver circuit estimates the carrier frequency offset (CFO). Any method of CFO estimation may be used.

In some embodiments, a frequency synthesizer controlling the working frequency for both the transmit action of 810 and the receive action of 825 is set before 810 and is not reset between 810 and 825. Accordingly, a locking circuit, such as a PLL or a DLL, of the frequency synthesizer may be locked before 810 and remain locked throughout 810 and 825.

At 825, the initiator transceiver circuit also performs I/Q measurement on the received continuous wave or other signal using the CFO estimate of 825 to compensate for the CFO of the communication. In addition, the reflector transceiver circuit also saves the CFO estimate and the I/Q measurement data of 825 in a memory so it can be used later, as described below with reference to 848.

In some embodiments, the order of operations is different. For example, in some embodiments, 820 occurs after 805, 825 occurs after 820, 810 occurs after 825, 815 occurs after 810, and 830 occurs after 815.

At 830, if another working frequency of the frequency band of interest is to be used, at 835, the working frequency is changed, and the method 800 returns to 810. Any total number of working frequencies may be used.

Otherwise, if another working frequency of the frequency band of interest is not to be used, at 838, the reflector transceiver circuit modifies the I/Q data generated in the I/Q measurements at the occurrences of 815. In accordance with that discussed above, in some embodiments, the I/Q data generated in the I/Q measurements at the occurrences of 815 was generated using CFO estimates specific to the communications which were used to generate the I/Q measurements.

To modify the I/Q data generated at the occurrences of 815, the reflector transceiver circuit removes the effect of those specific CFO estimates from the I/Q data. In some embodiments, to remove the effect of the CFO estimates from the I/Q data generated at the occurrences of 815, the reflector transceiver circuit may multiply each of the I/Q data measurements $r_n(t)$ generated at the occurrences of 815 by $\exp(2 \pi i F'n t)$ to generate uncompensated reflector I/Q measurements, where t is the sample time, and F'n is the CFO estimate used to generate $r_n(t)$.

At 840, the reflector transceiver circuit transmits data representing the uncompensated reflector I/Q measurements made at all occurrences of 815 to the initiator transceiver circuit. The working frequency of the transmission may be the last working frequency used at 810, 815, 820, and 825. In some embodiments, the working frequency of the transmission is another frequency, for example, of the frequency band of interest. The other frequency may have been communicated at 805. In some embodiments, the other frequency is specified by a communications standard.

At 845, the initiator transceiver circuit receives the data transmitted by the reflector transceiver circuit at 840. The initiator transceiver circuit receives the data transmitted from the reflector transceiver circuit at the working frequency.

At 848, the initiator transceiver circuit modifies the I/Q data generated at the occurrences of 825. In accordance with that discussed above, in some embodiments, the I/Q data generated at the occurrences of 825 was generated using CFO estimates specific to the communications which were used to generate the I/Q measurements.

To modify the I/Q data generated at the occurrences of 825, the initiator transceiver circuit removes the effect of the CFO estimates from the I/Q data generated at the occurrences of 825.

In some embodiments, to remove the effect of the CFO estimates from the I/Q data generated at the occurrences of 825, the initiator transceiver circuit may multiply each of the I/Q data measurements $r_n(t)$ generated at the occurrences of 825 by $\exp(2 \pi i F'n \, t)$ to generate uncompensated initiator I/Q measurements, where t is the sample time, and F'n is the CFO estimate used to generate $r_n(t)$.

In some embodiments, the initiator transceiver circuit, at 848, also includes the effect of a single CFO estimate on the uncompensated reflector I/Q measurements received at 845 and on the uncompensated initiator I/Q measurements. To include the effect of the single CFO estimate on the uncompensated reflector and initiator I/Q measurements, the initiator transceiver circuit may multiply each of the uncompensated I/Q data measurements by $\exp(-2 \pi i F \, t)$, to generate modified I/Q data, where F is the single CFO estimate.

The single CFO estimate may be a particular one of the CFO estimates of the I/Q data received from the reflector transceiver circuit at 845 and generated at the occurrences of 825. In some embodiments, the single CFO estimate may be an average of the CFO estimates of the I/Q data received from the reflector transceiver circuit at 845 and generated at the occurrences of 825.

In some embodiments, the initiator transceiver circuit includes the effect of a first CFO estimate on the uncompensated reflector I/Q measurements, and includes the effect of a second CFO estimate on the uncompensated initiator I/Q measurements.

To include the effect of the first CFO estimate on the uncompensated reflector I/Q measurements, the initiator transceiver circuit may multiply each of the uncompensated reflector I/Q measurements by $\exp(-2 \pi i F_1 \, t)$, to generate modified reflector I/Q data, where $F_1$ is the first CFO estimate. The first CFO estimate may be a CFO estimate received from the reflector transceiver circuit, for example, at 845. In some embodiments, the first CFO estimate may be a particular one of the CFO estimates generated by the reflector transceiver circuit at one of the occurrences of 815. In some embodiments, the first CFO estimate may be an average of the CFO estimates generated by the reflector transceiver circuit at the occurrences of 815. In some embodiments, the first CFO estimate is another CFO estimate.

In some embodiments, to include the effect of a second CFO estimate on the uncompensated initiator I/Q measurements generated at 848, the initiator transceiver circuit may multiply each of the uncompensated initiator I/Q measurements by $\exp(-2 \pi i F_2 \, t)$, to generate modified initiator I/Q data, where $F_2$ is the second CFO estimate. The second CFO estimate may be a particular one of the CFO estimates generated at the occurrences of 825. In some embodiments, the second CFO estimate may be an average of the CFO estimates generated at the occurrences of 825. In some embodiments, the first CFO estimate is another CFO estimate.

At 850, the initiator transceiver circuit estimates the distance between the initiator transceiver circuit and the reflector transceiver circuit based on the modified initiator and reflector I/Q measurements. Any method of estimating the distance may be used. For example, any methods of estimating the distance discussed herein may be used.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A transceiver circuit, comprising:
an antenna;
a receiver RF chain configured to receive a receiver RF signal from the antenna;
a transmitter RF chain configured to transmit a transmitter RF signal to the antenna; and
a controller configured to access a CFO (carrier frequency offset) estimate, and to, for each of one or more working frequencies:
cause the transmitter RF chain to transmit a transmitter RF signal to the antenna at each working frequency,
cause the receiver RF chain to receive a receiver RF signal from the antenna at each working frequency, and
generate first I/Q measurement data based at least in part on the received receiver RF signal and the CFO estimate,
wherein the controller is further configured to cause the receiver RF chain to receive I/Q measurement information for each working frequency from the antenna,
wherein the controller is further configured to generate second I/Q measurement data based at least in part on the received I/Q measurement information, and
wherein the controller is further configured to estimate a distance between the antenna and an antenna of another device based at least in part on the first and second I/Q measurement data.

2. The transceiver circuit of claim 1, further comprising a frequency synthesizer configured to control the working frequency, wherein the controller is configured to cause the frequency synthesizer to set the working frequency to a particular working frequency before causing the transmitter RF chain to transmit a particular transmitter RF signal to the antenna at the particular working frequency, and wherein the controller is configured to cause the frequency synthesizer to maintain the working frequency at the a particular working frequency at least until the controller causes the receiver RF chain to receive a particular receiver RF signal from the antenna at the particular working frequency.

3. The transceiver circuit of claim 1, further comprising a frequency synthesizer configured to control the working frequency, wherein the controller is configured to cause the frequency synthesizer to set the working frequency to a particular working frequency before causing the receiver RF chain to receive a particular receiver RF signal from the antenna at the particular working frequency, and wherein the controller is configured to cause the frequency synthesizer to maintain the working frequency at the a particular working frequency at least until the controller causes the transmitter RF chain to transmit a particular transmitter RF signal to the antenna at the particular working frequency.

4. The transceiver circuit of claim 1, wherein the controller is further configured to cause the receiver RF chain to receive a CFO RF signal from the antenna at a predetermined working frequency, and to generate the CFO estimate based at least in part on I/Q measurement data of the CFO RF signal.

5. The transceiver circuit of claim 4, wherein the one or more working frequencies comprises a plurality of working frequencies spanning a frequency band of interest, and wherein the predetermined working frequency is about in the middle of the frequency band of interest.

6. The transceiver circuit of claim 1, wherein the one or more working frequencies comprises first and second working frequencies, and wherein the first I/Q measurement data generated based in part on the receiver RF signals received at each of the first and second working frequencies are generated based in part on the same CFO estimate.

7. The transceiver circuit of claim 1, wherein the one or more working frequencies comprises a plurality of working frequencies, and wherein all of the first I/Q measurement data generated based on the received receiver RF signals which the distance is estimated based on, is generated based on the same CFO estimate.

8. The transceiver circuit of claim 7, wherein all of the I/Q measurement information used to generate the second I/Q measurement data is generated based on the same CFO estimate.

9. The transceiver circuit of claim 1, wherein the second I/Q measurement data is generated based in part on the same CFO estimate.

10. A transceiver circuit, comprising:
an antenna;
a receiver RF chain configured to receive a receiver RF signal from the antenna;
a transmitter RF chain configured to transmit a transmitter RF signal to the antenna; and
a controller configured to, for each of one or more working frequencies:
cause the transmitter RF chain to transmit a transmitter RF signal to the antenna at each working frequency,
cause the receiver RF chain to receive a receiver RF signal from the antenna at each working frequency,
generate a communication CFO estimate based at least in part on the received receiver RF signal, and
generate first I/Q measurement data based at least in part on the received receiver RF signal and the generated communication CFO estimate,
wherein the controller is further configured to cause the receiver RF chain to receive I/Q measurement information for each working frequency from the antenna,
wherein the controller is further configured to generate second I/Q measurement data based at least in part on the received I/Q measurement information,
wherein the controller is further configured to access a single CFO estimate,
wherein the controller is further configured to revise the first and second I/Q measurement data such that the revised first and second I/Q measurement data is generated based on the single CFO estimate, and
wherein the controller is further configured to estimate a distance between the antenna and an antenna of another device based at least in part on the revised first and second I/Q measurement data.

11. The transceiver circuit of claim 10, further comprising a frequency synthesizer configured to control the working frequency, wherein the controller is configured to cause the cause the frequency synthesizer to set the working frequency to a particular working frequency before causing the transmitter RF chain to transmit a particular transmitter RF signal to the antenna at the particular working frequency, and wherein the controller is configured to cause the frequency synthesizer to maintain the working frequency at the a particular working frequency at least until the controller causes the receiver RF chain to receive a particular receiver RF signal from the antenna at the particular working frequency.

12. The transceiver circuit of claim 10, wherein the controller is further configured to revise the first I/Q measurement data by removing an effect of the communication CFO estimate from the first and second I/Q measurement data.

13. The transceiver circuit of claim 12, wherein the controller is further configured to revise the first and second I/Q measurement data by including an effect of the single CFO estimate on the first and second I/Q measurement data.

* * * * *